Patented July 4, 1939

2,164,500

UNITED STATES PATENT OFFICE 2,164,500

SILICEOUS PRODUCT AND METHOD OF MAKING THE SAME

Arthur B. Cummins and Lewis B. Miller, Plainfield, N. J., assignors to Johns-Manville Corporation, New York, N. Y., a corporation of New York No Drawing. Application November 29, 1935, Serial No. 52,184

4 Claims. (Cl. 252—2)

This invention relates to a calcined siliceous product and the method of making the same. The invention relates especially to the calcination of diatomaceous earth in finely divided form with a non-metallic acidic flux.

There has been described heretofore the calcination of diatomaceous earth with compounds of metals, particularly alkali metals, that, during calcination, react with siliceous material to form a metal silicate.

It has now been discovered that the calcination of finely divided diatomaceous earth with a non-metallic acidic flux gives a product of particularly interesting properties. The product is adapted, for example, for use as a filter aid in the clarification of acid liquors that would react to a substantial extent if filtered with a conventional filter aid containing appreciable quantities of an alkali metal silicate. The product is adapted also for use as a filler, as in plastic compositions including rubber, paint, or asphalt products or in paper when lightweight filler particles of feebly acid reaction are desired.

The acidic substance for use as flux in the present invention should be one that, upon calcination as herein described, gives an acidic or non-basic residue or derivative and is adapted, either in its original composition or as a residual substance, to become associated integrally with the surface of the siliceous particles being calcined, as by chemical reaction therewith or solution therein. The substance should fuse or volatilize at or below the temperature of calcination, that is, undergo change of state.

Acidic fluxes that are particularly satisfactory for the present purposes include the following: metaboric acid, boron trioxide, pyroboric acid, and orthoboric acid, all of which are intended to be included in the term "a boric acid compound" as used in the claims hereof, whether in the form of the acid or anhydride thereof, but said term being exclusive of the salts such as borax. Orthoboric acid ($H_3BO_3$) is a convenient and suitable flux. Another flux that has been used and that illustrates the suitable type is hydrofluosilicic acid.

In making the improved product of the present invention, the following method may be followed. There is first formed a mixture of diatomaceous earth and a small proportion of the acidic flux. This mixture is then subjected to calcination, that is, to an elevated temperature adapted to cause substantial reaction (integral association), such as solution or chemical change, between the particles of diatomaceous earth and the acidic substance. The temperature of calcination is sufficiently elevated to cause sintering of the mixture, as evidenced by its tendency to form into weak aggregates and by a large improvement in the rate of filtration of a selected liquid through the product of the calcination, in comminuted form, as compared with the rate of filtration for the diatomaceous earth originally used. At the same time, the temperature of calcination should not be so high as to cause fusion of the entire mass or the formation of hard burned granules not readily dispersed into fine particles by mild milling, as by being passed through a high-speed blower. While the temperature of calcination will vary somewhat with the proportion of acidic substance used, a suitable range of calcination temperatures is approximately 1700° to 2000° F., preferably about 1800° to 1900° F.

The proportion of acidic substance should be such as to produce a substantial effect upon the properties of diatomaceous earth that is calcined therewith, but not sufficiently large as to leave a high proportion of soluble material in the finished product or to cause over-sintering or fusion of the whole mass during the calcination. Five to ten parts by weight of the acidic substance to 100 parts of diatomaceous earth is a suitable proportion. Thus, there has been used to advantage boric acid in amount corresponding to 2.5 to 10 parts by weight, calculated as boric oxide, to 100 parts of diatomaceous earth. A proportion of boric acid that is preferred at this time corresponds to about 5 parts by weight of boric oxide to 100 parts of diatomaceous earth.

The calcination may be made in a muffle furnace, rotary kiln, or other suitable equipment.

In a typical preparation, there was formed a mixture comprising orthoboric acid and finely divided diatomaceous earth of quality and degree of subdivision corresponding to the powder used as filter aid. The proportion of boric acid corresponded to 6 parts by weight of boric oxide by weight for each 100 parts of diatomaceous earth. The mixture was calcined in a muffle furnace at a temperature of approximately 1800° F., for 60 minutes. The resulting material had a light pink color and was less harsh and less gritty than diatomaceous earth similarly calcined in the presence of sodium carbonate, sodium chloride, or the like.

Also, the product, after light milling to destroy weak lumps or aggregates therein, was particularly satisfactory as a filter aid. When mixed with a solution of raw sugar of density commonly used commercially and tested for filtration property, the product showed a rate of filtration that was 615% of the rate found with the same diatomaceous earth as used originally, that is, before being mixed with the boric acid and calcined.

In other calcinations, using boric acid corresponding to 3% of boric oxide on the weight of diatomaceous earth and calcining at 1800° F., it was found that raising the temperature slowly, to the maximum selected for the calcination, improved the product from the standpoint of rate of filtration of liquids therethrough. Thus, the product of a calcination in which the temperature was raised from atmospheric to 1800° F. in the course of ten minutes and then maintained at 1800° F. for 45 minutes, showed a filtration rate of 475% of that of the original diatomaceous earth. This rate is substantially higher than that obtained by calcining a similar mixture at the same maximum temperature, for either 30 or 60 minutes, when the temperature of the mixture was raised rapidly from atmospheric to the maximum selected.

Examination of the product, made as described, shows a large part of the boron of the original boric acid remaining after the calcination, presumably as a derivative of the boric acid, such as borosilicate. This residue or derivative is integrally associated by sintering with the particles of diatomaceous earth, presumably by solution therein, the solution obviously being solid at ordinary temperatures.

The relatively large siliceous particles constituting practically whole diatom units, although actually extremely small, retain to a large extent their structure throughout the calcining operation, in distinction from glasses made heretofore, with loss of shape and the siliceous particles initially used.

It is not necessary to the invention to explain the remarkable changes that occur, inasmuch as the invention comprises all of the results achieved, regardless of their cause.

The water-solubility of the product is exceedingly low, although boron compounds in the proportion of at least one per cent by weight, calculated as boron trioxide, are present.

The details that have been given are for the purpose of illustration, not restriction. It is intended that variations within the spirit of the invention should be included within the scope of the appended claims.

What we claim is:

1. A calcined product resulting from the process comprising forming a mixture of finely divided diatomaceous earth and a small proportion of hydrofluosilicic acid and subjecting the mixture to calcination.

2. A process of manufacturing a powdered diatomaceous earth product suitable for use as a filter aid, filler and other purposes which comprises forming a mixture of finely divided diatomaceous earth with a relatively small amount of a boric acid not in excess of about 10% by weight of the diatomaceous earth, calcining the mixture so as to cause interaction of the boric acid compound and diatomaceous earth, but not sufficient to bring about the formation of hard, burned granules.

3. A calcined powdered diatomaceous earth product adapted for use as a filter aid, filler, and other purposes, consisting primarily of finely divided diatomaceous earth and a small proportion of the reaction product resulting from the calcination of the diatomaceous silica with a boric acid not in excess of about 10% by weight of the diatomaceous earth at high temperatures, said product being pink in color and exhibiting a slightly acidic reaction in aqueous solution.

4. A process of manufacturing a powdered diatomaceous earth product suitable for use as a filter-aid, filler and other purposes which comprises forming a mixture of finely divided diatomaceous earth with a relatively small amount of a non-metallic acidic flux selected from the group consisting of hydrofluosilicic acid and a boric acid not in excess of about 10% by weight of the diatomaceous earth, calcining the mixture so as to cause interaction of said flux and diatomaceous earth, but not sufficient to bring about the formation of hard, burnt granules.

ARTHUR B. CUMMINS.
LEWIS B. MILLER.